US006999472B2

United States Patent
Hamalainen et al.

(10) Patent No.: US 6,999,472 B2
(45) Date of Patent: Feb. 14, 2006

(54) APPARATUS, AND ASSOCIATED METHOD, FOR SPACE-TIME ENCODING, AND DECODING, DATA AT A SELECTED CODE RATE

(75) Inventors: Jyri Hamalainen, Oulu (FI); Risto Wichman, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 869 days.

(21) Appl. No.: 09/870,260

(22) Filed: May 30, 2001

(65) Prior Publication Data

US 2003/0053487 A1 Mar. 20, 2003

(51) Int. Cl.
- H04J 3/16 (2006.01)
- H04J 3/22 (2006.01)
- H04B 7/02 (2006.01)
- H04L 1/02 (2006.01)
- H04L 23/02 (2006.01)
- H04L 5/12 (2006.01)

(52) U.S. Cl. .................. 370/468; 375/267; 375/265; 375/295; 370/328; 370/329; 370/330; 370/465

(58) Field of Classification Search ............... 375/295, 375/265, 267; 370/328, 329, 330, 465, 468; 455/101, 103, 132
See application file for complete search history.

(56) References Cited

U.S. PATENT DOCUMENTS

| | | | |
|---|---|---|---|
| 5,479,448 A | * | 12/1995 | Seshadri ............... 375/267 |
| 6,678,263 B1 | * | 1/2004 | Hammons et al. ...... 370/342 |
| 6,771,706 B2 | * | 8/2004 | Ling et al. ............. 375/267 |

* cited by examiner

*Primary Examiner*—Chi Pham
*Assistant Examiner*—Christopher Grey
(74) *Attorney, Agent, or Firm*—G. Peter Albert, Jr.; Foley & Lardner, LLP

(57) ABSTRACT

Apparatus, and an associated method, for space-time encoding data to be communicated upon a communication channel susceptible to fading. Multi-rate data services can be effectuated through appropriate selection of the code rate by which data is encoded. And, the coding of space-time encoded data is facilitated as different permutations of coded data symbols are separate transmitted upon separate communication paths.

18 Claims, 3 Drawing Sheets

APPARATUS, AND ASSOCIATED METHOD, FOR SPACE-TIME ENCODING, AND DECODING, DATA AT A SELECTED CODE RATE

TECHNICAL FIELD OF THE INVENTION

The present invention relates generally to a manner by which to communicate data, such as data communicated during operation of a cellular, or other radio, communication system, utilizing space-time encoding, and decoding, techniques. More particularly, the present invention relates to apparatus, and an associated method, by which to space-time encode data in a manner such that more than one, or all, of the permutations of code vectors generated during coding operations are formed at a sending station and sent to a receiving station. Multiple data rate services, are effectuable pursuant to an embodiment of the present invention. Different code rates, including fractional code rates, are selectably provided pursuant to the coding operations.

BACKGROUND OF THE INVENTION

The use of communication systems through which to communicate data between separate, spaced-apart locations is a necessary adjunct of modern society. A wide variety of different types of communication systems have been developed and are regularly utilized to effectuate communication of data between sending and receiving stations positioned at the separate, spaced-apart locations.

Improvements to existing types of communication systems, as well as implementation of new types of communication systems, have been made possible as a result of advancements in communication technologies. Radio communication systems exemplary of communication systems which have benefited from the advancements in communication technologies. Improvements to existing types, as well as introduction of new types, of radio communication systems have been made possible as a result of the advancements in communication technologies.

A radio communication system inherently permits an increase in communication mobility in contrast to communications effectuated through the use conventional, wireline communication systems. Increased communication mobility is provided as the communication channels defined between the sending and receiving stations of the radio communication systems are defined upon radio links formed therebetween. The communication channels are referred to as radio communication channels and do not require fixed connections between the sending and receiving stations for their formation.

Radio, and other, communication systems are increasingly implemented to utilize digital communication techniques. The use of digital communication techniques permits the communication capacity of a communication system to be increased in contrast to the use conventional, analog techniques. Also, digital communication techniques permit improvement in the quality levels of the communications effectuated in a communication system.

Data which is to be communicated utilizing digital communication techniques is digitized at a sending station. Once digitized, the digitized information is formatted, such as into data packets, and converted into a form to permit its communication upon the communication channel to the receiving station.

In an ideal communication system, the data packets, subsequent to their transmission upon the communication channel and reception at a receiving station, are substantially identical in value to the corresponding data packets prior to their communication upon the communication channel.

Distortion, however, is introduced upon the data during its communication upon a communication channel of an actual communication system. The distortion introduced upon the data causes the values of the data, when received at the receiving station, to differ with the corresponding values of the data packets prior to their communication upon the communication channel. If the amount of distortion is significant, the informational content of the data cannot accurately be recovered at the receiving station.

Multi-path transmission upon the communication channel defined upon the radio link formed between the sending and receiving stations, for instance, causes fading of the data during its communication upon the communication channel. Such fading might alter the values of the symbols of the data, such as the symbols of a data packet, during transmission upon the communication channel. Alteration of the values of the symbols of the data during communication upon the communication channel is referred to as propagation distortion. If the propagation distortion is not properly corrected, the communication quality levels of the communications are, at a minimum, reduced. Various techniques are utilized to compensate for the propagation distortion introduced upon the data as a result of the communication of the data upon a nonideal communication channel.

Increasing the transmit diversity of the data is utilized, for instance, to increase the likelihood that the informational content of the data can be recovered. Time-diversity is a type of transmit diversity. Time-encoding of data, prior to its communication, is referred to as creating time diversity. When the data is time-encoded, the redundancy of the data is increased. Because of the increased redundancy, loss of portions of the data due to fading is less likely to prevent the recovery of the informational content of the data.

Space diversity is also a type of transmit diversity. Space diversity is also utilized to compensate for propagation distortion. Generally, space diversity refers to the utilization of more than one transmit antenna at a sending station at which to transduce the data. The antenna transducers are separated by distances great enough to ensure that the data communicated from the respective transducers fade in an uncorrelated manner. When uncorrelated, fading of the data transmitted upon one communication path to a receiving station is unlikely to fade in the same manner and at the same the time as data communicated to the receiving station upon a different communication path.

Space and time diversity are sometimes utilized together, thereby further to enhance transmission diversity to combat propagation distortion resulting from fading caused by, e.g., multi-path transmission of data. Use of both space and time diversity is referred to as use of space-time diversity.

Space-time codes have been developed, and encoders have been developed to space-time encode the data which is to be communicated to achieve transmit diversity to compensate for communication of the data upon the channels susceptible to fading. And, correspondingly, space-time decoders, operable to decode space-time encoded data at a receiving station have also been developed. Proposals have been set forth, for instance with respect to operational requirements proposed for third-generation cellular communication systems, to provide for multi-data rates services. Such proposals do not permit the use of conventional, space-time coding techniques as, conventionally, variability of coding rates are generally not permitted when conventional, space-time coding techniques are utilized.

An manner by which to provide a space-time code by which to encode data to be communicated upon a channel susceptible to fading which is also permitting of coding at different coding rates is therefore required.

It is in light of this background information related to space-time encoding, and decoding, of data that the significant improvements of the present invention have evolved.

SUMMARY OF THE INVENTION

The present invention, accordingly, advantageously provides apparatus, and an associated method, by which to communicate data, such as data communicated during operation of a cellular, or other radio, communication system utilizing space-time encoding, and decoding, techniques.

Through operation of an embodiment of the present invention, a manner is provided by which to space-time encode data in a manner such that more than one, or all, of the permutations of code vectors generated during coding operations are formed at a sending station and sent to a receiving station. A selectable coding rate, such as a fractional coding rate, permits the effectuation of multiple data rate services. Multiple data rate services, such as those permitted pursuant to operation of a third-generation cellular communication system utilizing space-time coding techniques are implementable through appropriate selection of the encoding rate by which the data is encoded.

In one aspect of the present invention, a space-time encoder is provided for a sending station which is operable to send data in a form which exhibits transmit diversity. A trellis coding scheme is utilized by which to encode data provided to the space-time encoder. Symbols of the data are encoded to form code symbols in which successive ones of the code symbols form code vectors. The code vectors contain separate permutations of the code symbols. And, separate ones of the code vectors are applied to separate antenna transducers, spaced-apart from one another. The separate permutations of the code vector are transduced by the separate antenna transducers and sent upon separate communication paths through a receiving station. The space-time coding of the data, and subsequent transmission of the separate permutations of the code vector facilitates decoding of the data as each permutation of the code vector is available, when received at a receiving station, to be decoded thereat.

In another aspect of the present invention, a decoder is provided for a receiving station operable in a communication system to receive space-time encoded data transmitted to the receiving station upon separate communication paths. Indications of the detected data are provided to the decoder which space-time decodes the data received thereat. The coding is performed, for instance, utilizing a cumulative metric in which a permutation matrix is defined. Pursuant to encoding of data at a sending station according to an embodiment of the present invention, each permutation of a code vector of which the data is formed is available for decoding, and the obtained code is symmetrical in the sense that fading exhibited on any of the communication paths has the same the effect to the decoding.

In one implementation, a manner of encoding, and a corresponding manner of decoding, is provided for a so-called third generation, cellular communication system. Encoding is performed at a selected rate, selectably including a fractional rate, thereby to permit effectuation of multiple rate services. A space-time encoder is provided for a sending station, such as the transmitter portion of a base transceiver station or the transmitter portion of a mobile station operable in the cellular communication system. The encoder is coupled to receive indications of data and to receive indications of selection of the data rate at which a communication service is be effectuated. The encoder is operable to encode the symbols of the data provided thereto to form coded symbols of a code vector. Permutations of the code symbols are provided to two or more separate antenna transducers to be transduced thereat for transmission upon separate paths of a radio channel to a receiving station. The receiving station is formed of, for instance, the receiver portion of a mobile station or the receiver portion of a base transceiver station. The receiving station includes a decoder operable to decode space-time encoded data received at the receiving station. Decoding is performed pursuant to a cumulative metric which utilizes a permutation matrix. Decoding operations are performed to decode the space-time encoded data and to form space-time decoded data. Space-time decoded data is thereafter provided to other receive portions of the receive station at which other receive operations are performed upon the space-time decoded data.

In these and another aspects, therefore, apparatus, and an associated method, is provided for a communication system having a sending station for sending data upon a channel susceptible to distortion. The sending station has a first location from which the data is sent and at least a second location from which the data is sent. The data is space-time encoded at a selected coding rate, and the selected coding rate is a selected one of a first coding rate and at least a second coding rate. A space-time encoder is coupled to receive indications of the selected coding rate and to receive the data to be sent by the sending station. The space-time encoder encodes the data to form separate encoded data sequences. A separate data sequence is applied to each of the first location and the at least second location. The separate data sequences have separate permutations of the data.

A more complete appreciation of the present invention and to the scope thereof can be obtained from the accompanying drawings which are briefly summarized below, the following detailed description of the presently preferred embodiments of the invention, and the appended claims.

DETAILED DESCRIPTION OF THE INVENTION

Figure 1:
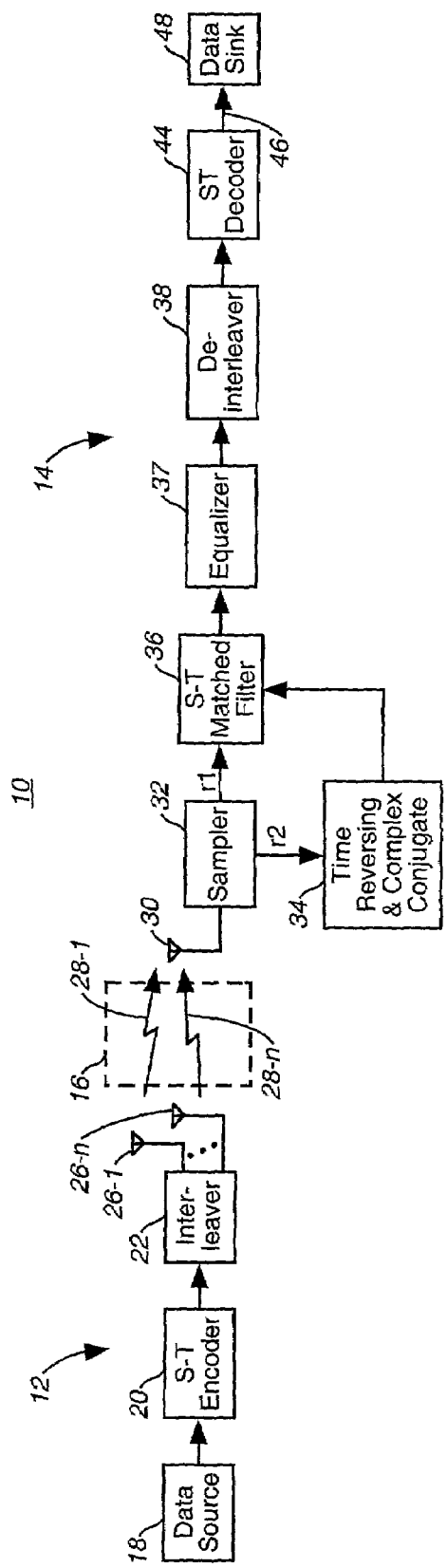
FIG. 1 illustrates a functional block diagram of a communication system in which an embodiment of the present invention is operable.

Referring first to FIG. 1, a communication system, shown generally at 10, is operable to communicate data between a sending station 12 and a receiving station 14. The communication of the data is effectuated upon a communication channel 16. To communicate the data upon the communication channel, the sending station at which the data is sourced, converts the data into a form to permit its communication upon the communication channel. And, once received at the receiving station, the informational content of the data is recreated.

In the exemplary implementation shown in the figure, the communication system 10 forms a radio communication system in which the communication channel 16 is defined upon a radio link formed of a portion of the electromagnetic spectrum. More particularly, the communication system 10 here forms a third-generation (3G) cellular communication system in which the sending station 12 here forms a base transceiver station (BTS), and the receive station here forms a mobile station operable in the cellular communication system.

While the following descriptions shall describe operation of is the communication system with respect to the exemplary implementation formed of a cellular communication system, it should be understood that operation of an embodiment of the present invention is analogously also operable in any communication system to facilitate communication of data between a sending station and a receive station upon a communication channel which is susceptible to fading, or other propagation distortion.

Data to be communicated by the base transceiver station 12 is sourced at a data source 18. While not separately shown, circuitry of the base transceiver station is operable to digitize, the source-encode, to interleave, and to perform other processing functions upon the data.

The data is then provided to a space-time encoder 20. The space-time encoder is operable pursuant to an embodiment of the present invention to space-time encode data provided thereto to form space-time encoded data.

The space-time encoded data is interleaved by an interleaver 22 and then provided to a plurality of n antenna transducers 26 here designated at 26-1 through 26-n. The antenna transducers are operable to transduce space-time encoded data into electro-magnetic form for communication upon the communication channel. Because of the space-apart positioning of the antenna transducers 26, the transduced, space-time encoded data generated by the separate ones of the antenna transducers are communicated by separate communication paths, here indicated by the communication paths 28-1 through 28-n to the mobile station 14. When the communication paths upon which the data transduced by the separate ones of the antenna transducers are transmitted exhibit uncorrelated fading characteristics such that fading exhibited by the data transmitted upon separate communication paths fade at different rates, magnitudes, and times.

The mobile station 14 includes one or more antenna transducers 30. Here, a single antenna transducer 30 is represented, here operable to detect the space-time encoded data communicated upon separate ones of the communication paths 28 upon the communication channel 16. Indications of data detected by the antenna transducer 30, are transduced into electrical form, and are sampled by a sampler 32. The sampled signal forwarded to a space-time decoder 44. The space-time decoder is operable to space-time decode the space-time encoded data provided thereto and to generate space-time decoded data, here on the line 46, for subsequent application to other circuitry of the mobile station. While not separately shown, channel-decoding, deinterleaving, and other processing functions are performed upon the space-time decoded data. And, the data is subsequently provided to a data sink 48.

In contrast to conventional encoding schemes, and corresponding schemes by which to decode the encoded data, the space-time encoding provided pursuant to an embodiment of the present invention permits selection of more than one coding rate at which to encode the data to permit the effectuation of multiple data rate services. Fractional code rates are selectable pursuant to operation of an embodiment of the present invention, and more than one, or all, of the permutations of code vectors formed during operation of the space-time encoder are applied to the antenna transducers 26. By providing the different permutations of the code vector to the receiving station, fading upon any of the communication paths causes the same affect to decoding operations performed by the decoder.

A mathematical representation of the formation of the space-time encoded data for the communication pursuant through operation of the communication system 10 and, also, corresponding decoding of the data by the space-time decoder of an embodiment of the present invention illustrates advantageous operation of an embodiment of the present invention.

Space-time encoding performed by the encoder 20, here a trellis encoder, encodes each data symbol of the data provided thereto into a vector, $s_t$, of code symbols:

$$s_t = (s_{t,1}, s_{t,2}, K, s_{t,n})^T, t=1,2,K,L,$$

wherein:
n is the number of transmit antenna transducers 26; and
L is the length of a data burst.

Code symbols $s_{t,1}, s_{t,2}, K, s_{t,n}$ of the code vector formed by the encoder 20 are provided to the n separate antenna transducers 26 to be transduced thereat and transmitted upon the separate communication paths 28.

When received at the mobile station 14, the received values, r, detected at a single antenna transducer 30 are represented by:

$$r_t = h^T s_t + \eta_t, \; t=1,2,K,L,$$

wherein:
$h = (h_1, h_2, K, h_n)^T$ which consists of the path gains corresponding to the n communication paths; and
$\eta_t$ is a sample of a zero mean complex Gaussian random variable.

Decoding performed at the decoder 44 upon the information symbols utilizes a Viterbi algorithm that applies the cumulative metric:

$$d^2 = \sum_{t=1}^{L} \left| r_t - \sum_{i=1}^{n} h_i s_{t,i} \right|^2.$$

While not separately shown, a generalization of the representation of the received values, r, when the mobile station includes more than one antenna transducer 30 is straightforward.

The encoding of the data symbols performed at the encoder 24 is performed in a manner analogous to conventional encoding operations. Therefore, n bursts of code symbols denoted by $B_1, B_2, K, B_n$ are formed.

At a data rate of $1/\kappa, 2 \leq \kappa \leq n$ and when the burst of code symbols provided to a first antenna transducer 26-1 is represented by $B_1, B_2, K, B_\kappa$. A burst of code symbols provided to a second antenna transducer 26-2 is represented by $B_2, B_3, K, B_{\kappa+1}$. And, a burst of code symbols provided to an nth antenna transducer 26-n is represented by $B_n, B_1, K, B_{\kappa+n-1}$.

For all burst indices l, a value of l can be determined wherein:

$$l = \text{mod}(l-1, n) + 1$$

exists. Encoding performed by the encoder is based upon any of various space-trellis codes.

Subsequent to communication of the data upon the channel 16 and detection at the mobile station, the receive signals are represented by:

Let k indicate the number of a burst period. During κ burst periods we receive signals $$r_t^k = (\sigma_{k-1} h^k)^T s_t + \eta_t^k, \quad t=1,2,K,L, \quad k=1,2,K,\kappa.$$

Wherein:
k is the number of the burst period; and
$\sigma_k$ is a permutation matrix defined by $$(\sigma_k)_{ij} = \begin{cases} 1, & j = \text{mod}(i+k-1, n) + 1, \\ 0, & j \neq \text{mod}(i+k-1, n) + 1. \end{cases}$$

Decoding of information symbols at the decoder is based on the cumulative metric $$\sum_{t=1}^{L} \sum_{k=1}^{K} |r_t^k - (\sigma_{k-1} h^k)^T s_t|^2.$$

Again, the generalization to the case of m receive antennas is straightforward.

The space-time encoding provided by an embodiment of the present invention is symmetrical in that symmetry is provided to the encoding of the data. For example, let n=κ=3 and let the code symbols in the first burst at some time instant t be $s_{t,1}, s_{t,2}, s_{t,3}$. Then, the symbols transmitted by the antenna transducers 26-1 (Tx1), 26-2 (Tx2), and 26-3 (Tx3) is shown in the following table:

| Time | Tx1 | Tx2 | Tx3 |
|------|-----|-----|-----|
| t | $s_{t,1}$ | $s_{t,2}$ | $s_{t,3}$ |
| t + L | $s_{t,2}$ | $s_{t,3}$ | $s_{t,1}$ |
| t + 2L | $s_{t,3}$ | $s_{t,1}$ | $s_{t,2}$ |

Each permutation of the codevector $(s_{t,1}, s_{t,2}, s_{t,3})$ is thereby provided to the mobile station, thereafter to be available for decoding operations performed at the decoder 44. The obtained code is symmetrical in the sense that fading upon any of three channels has the same affect to the decoding.

The space-time encoding performed by the encoder permits selection of separate coding rates to be utilized. That is to say, a simple way to design a rate $1/\kappa, 2 \leq \kappa \leq n$ of space-time codes is provided when rate 1 space-time codes are available for n transmit antenna-transducer systems. By providing a selectable coding rate, multiple data rate services can be effectuated by the base transceiver station, as required pursuant to a third-generation cellular communication system of which the system 10 is representative. When convolutional codes are used to implement multiple data rate services, only a few mother codes and several different puncturing patterns are utilized. But, generally, existing convolutional codes do not work well with outer convolutional codes that are typically used in third-generation systems. Moreover, existing space-time codes generally do not provide different puncturing patterns so that their applicability is limited for utilization in a third-generation system. This problem is solved by operation of an embodiment of the present invention as codes with different, selected code rates are utilized. Moreover, fractional coding rates between 1/κ and 1 can be obtained similar to punctured convolutional codes, i.e. using the same encoding and decoding structure.

An example of a rate ½ code is given. This code is especially useful in time division multiple access systems. The code assumes that at least two transmit antennas and one receive antenna are available. The proposed code employs the structure where a burst of data symbols is first encoded using any space time code designed for a two transmit antenna systems. Then coded symbols, formed by the encoder 20, are interleaved by the interleaver 22, albeit interleaving is not a mandatory operation. Once interleaved, the coded symbols are divided into two bursts of coded, interleaved symbols. The symbol bursts of length L are denoted by B1 and B2. Transmission utilizes two transmit antennas 26-1 and 26-2, in such a way that during the first time frame of L symbols burst B1 is transmitted from antenna 26-1 and burst B2 is transmitted from antenna 26-2. Then, during the second time frame of L symbols, the burst $-(B2)^*$ is transmitted from antenna 26-1 and burst B1* is transmitted from antenna 26-2. Here operation B* means that symbols in burst B are time reversed and complex conjugate is taken from each symbol.

In the receiver 14, sample vectors r1 and r2 corresponding to consecutive time frames are obtained at the sampler 32. First, vector r2 is time reversed and complex conjugates are taken by the element 34 from its components. Then space-time matched filtering and proper equalizing are employed by the matched filter and by the equalizer. In the next stage symbols are deinterleaved by the deinterleaver and finally, decoding corresponding to the outer space-time code is implemented by the decoder.

Comparison of performance of the space-time encoding provided pursuant to operation of an embodiment is made below relative to conventional encoding schemes to show advantageous performance of the encoding provided by the encoder 24. Let:

$$E(h_i^k \overline{h_i^l}) = \gamma, \quad \gamma \in [0,1], \quad i=1,2,K,n, \quad k \neq l.$$

If γ=0 then the channel parameters corresponding to each burst are totally independent. In this case, the expected error performance for rate 1/κ space-time-coding performed by the encoder 24 is equal with the expected error performance of the underlying rate 1 ST-code when κ receive antenna transducers 32 is used. Analysis is also made when γ=1. In this case all n communication paths remain constant during the κ consecutive bursts.

Since all n communication paths are assumed to remain constant, the index k can be removed from the channel parameter vector. The probability that maximum likelihood receiver operation at the mobile station makes an error in favor of a signal is:

$$e = e_{1,1} e_{1,2} L e_{1,n} e_{2,1} e_{2,2} L e_{2,n} L L e_{L,1} e_{L,2} L e_{L,n}$$

assuming that $$s = s_{1,1} s_{1,2} L s_{1,n} s_{2,1} s_{2,2} L s_{2,n} L L s_{L,1} s_{L,2} L s_{L,n}$$

was transmitted by the base transceiver station. The probability of transmitting s and deciding in favor of e at the decoder is approximated by:

$$P(s \to e) \leq e^{-d^2(s,e)E_s/4N_0},$$

where $$d^2(s, e) = \sum_{t=1}^{L} \sum_{k=1}^{K} |(\sigma_{k-1}h)^T(s_t - e_t)|^2.$$

The matrix formulation for this equation is $$d^2(s, e) = \sum_{k=1}^{K} (\sigma_{k-1}h)^T A(\sigma_{k-1}\bar{h}),$$

$$A = (a_{ij})_{i,j=1}^{n}, \quad a_{ij} = \sum_{t=1}^{L} (s_{t,i} - e_{t,i})\overline{(s_{t,j} - e_{t,j})}.$$

Furthermore, $$(\sigma_{k-1}h)^T A(\sigma_{k-1}\bar{h}) = h^T (\sigma_{k-1}^T A \sigma_{k-1})\bar{h},$$

where $$\sigma_{k-1}^T A \sigma_{k-1} = \begin{pmatrix} a_{k,k} & a_{k,k+1} & L & a_{k,k-1} \\ a_{k+1,k} & a_{k+1,k+1} & L & a_{k+1,k} \\ M & M & O & M \\ a_{k-1,k} & a_{k-1,k+1} & L & a_{k-1,k-1} \end{pmatrix}$$

and for all indices l of matrix elements there holds l=mod (l−1,n)+1. Denoting $\Omega = \Omega_1$ from the previous three equations, the following is obtained:

$$d^2(s, e) = h^T \underline{A} \bar{h}, \quad \underline{A} = (\underline{a}_{ij})_{i,j=1}^n, \quad \underline{a}_{ij} = \sum_{k=0}^{\kappa-1} a_{i+k,j+k},$$

$$i + k = \mod(i + k - 1, n) + 1.$$

The error bound for our code depends on the product of eigenvalues $\underline{\lambda}_1, \underline{\lambda}_2, \ldots, \underline{\lambda}_r$ of matrix $\underline{A}$. That is, $$P(s \to e) \leq \left( \left( \prod_{i=1}^{r} \underline{\lambda}_i \right)^{\frac{1}{r}} \frac{E_s}{4N_0} \right)^{-r}, \quad r \leq n,$$

where r is the rank of the matrix $\underline{A}$.

Further analysis indicates that, in a particular case where κ=n, the matrix $\underline{A}$ attains a circulant form and its eigenvalues can be computed directly from the first row. This result can be clarified by the following, where p=j−i≧0. Then, the following exists:

$$\underline{a}_{i,i+p} = \sum_{k=0}^{n-1} a_{i+k,i+p+k} = \sum_{l=i}^{i+n-1} a_{l,l+p} = \sum_{l=1}^{n} a_{l,l+p}.$$

Since the last sum does not depend on the index i, then $\underline{a}_p$ can be written instead of $\underline{a}_{i,j}$ when j−i=p≧0 and matrix $\underline{A}$ has now the form:

$$\underline{A} = \begin{pmatrix} a_1 & a_2 & L & a_n \\ \overline{a}_2 & a_1 & L & a_{n-1} \\ M & M & O & M \\ \overline{a}_n & \overline{a}_{n-1} & L & a_1 \end{pmatrix},$$

$$a_i = \sum_{k=1}^{n} \sum_{t=1}^{L} (s_{t,k+i-1} - e_{t,k+i-1})\overline{(s_{t,k} - e_{t,k})}.$$

Let n=4. Then, the following can be represented:

$$a_3 = a_{1,3} + a_{2,4} + a_{3,1} + a_{4,2} = \overline{a}_{1,3} + a_{1,3} + \overline{a}_{2,4} + a_{2,4}$$

$$\underline{a}_2 = a_{1,2} + a_{2,3} + a_{3,4} + a_{4,1} = \overline{a}_{1,4} + a_{2,1} + \overline{a}_{3,2} + \overline{a}_{4,3}$$

Thus $a_3$ is real and $\underline{a}_2 = \overline{a}_4$. In a similar manner, it can be shown that:

If n=2m, m∈N then $a_{m+1}$ is real and $a_{m+k} = \overline{a}_{m-k+2}$, k=2,3 . . . ,m, and if n=2m+1, m∈N then $a_{m+k} = \overline{a}_{m-k+3}$, k=2,3,K,m+1.

Using these two representations, then the matrix $\underline{A}$ has the form:

$$\underline{A} = \begin{pmatrix} \underline{a}_1 & \underline{a}_2 & L & \underline{a}_n \\ \underline{a}_n & \underline{a}_1 & L & \underline{a}_{n-1} \\ M & M & O & M \\ \underline{a}_2 & \underline{a}_3 & L & \underline{a}_1 \end{pmatrix}$$

where elements $\underline{a}_k$ are defined via the same two representations. This means that $\underline{A}$ is a circulant matrix and its eigenvalues are given by:

$$\underline{\lambda}_p = \sum_{k=1}^{n} \underline{a}_k e^{j2\pi(k-1)(p-1)/n}, \quad p = 1, 2, K, n.$$

This equality can be useful in code design.

Rate ½ coding can also be analyzed when two antenna transducers 26 are utilized together with a simple repetition code in which the same coded data is transduced by, and transmitted from, the same antenna transducer, twice in consecutive bursts. Let $A = (a_{ij})_{i,j=1}^2$ be the matrix corresponding to the underlying space-time code. Then:

$$A = \begin{pmatrix} a_{11} + a_{22} & 2\operatorname{Re} a_{12} \\ 2\operatorname{Re} a_{12} & a_{11} + a_{22} \end{pmatrix}.$$

Moreover, the product of eigenvalues of $\underline{A}$ is given by:

$$\underline{\lambda_1 \lambda_2} = (a_{11} + a_{22})^2 - 4(REa_{12})^2.$$

For a simple repetition space-time code the product of eigenvalues is:

$$\lambda_1 \lambda_2 = 4(a_{11} a_{22} - |a_{12}|^2).$$

And, using the estimates:

$$(Rea_{12})^2 \leq |a_{12}|^2, \ 2a_{11} a_{22} \leq a_{11}^2 + a_{22}^2$$

then, the following is represented:

$$\lambda_1 \lambda_2 \leq 2a_{11} a_{22} + a_{11}^2 + a_{22}^2 - 4(Rea_{12})^2 = \underline{\lambda_1 \lambda_2}.$$

Thus, the space-time encoding provided by the encoder 24 is always at least as good as the simple repetition space-time code in which the same coded data is transmitted from the same antenna transducers twice in consecutive bursts. Both codes have the same performance if and only if:

$$a_{11} = a_{22}, \ Ima_{12} = Ima_{21} = 0.$$

This is the case when the so-called delay diversity, DD, is the underlying code.

Next, a particular example is considered. In this example the underlying coding scheme is an eight-state space-time code. The eight-PSK (phase shift keying) constellation is:

$$C = \left\{ s(m) = \frac{1}{\sqrt{2}} e^{jm/4} : m = 0, 1, 2, K, 7 \right\}.$$

In the case of this eight-state space-time code, the matrix which gives eigenvalues in the error estimate is obtained by studying the error corresponding to sequences:

$$s = 00\ 00, \ e = 01\ 50.$$

Thereby, A can be represented as:

$$A = \begin{pmatrix} 2 \sin^2 \frac{5\pi}{8} & 0 \\ 0 & 2 \sin^2 \frac{\pi}{8} \end{pmatrix}.$$

And, when encoding operations are performed pursuant to operation of the encoder 24, the following is obtained:

$$A = \begin{pmatrix} 2\left(\sin^2 \frac{\pi}{8} + \sin^2 \frac{5\pi}{8}\right) & 0 \\ 0 & 2\left(\sin^2 \frac{\pi}{8} + \sin^2 \frac{5\pi}{8}\right) \end{pmatrix}.$$

Thus, the product of eigenvalues is ½ for the underlying space-time code, 4 for encoding performed pursuant to operation of the encoder 24, and 2 for a simple repetition scheme, where the same coded data is transmitted from the same antenna transducers twice in consecutive bursts.

Figure 2:
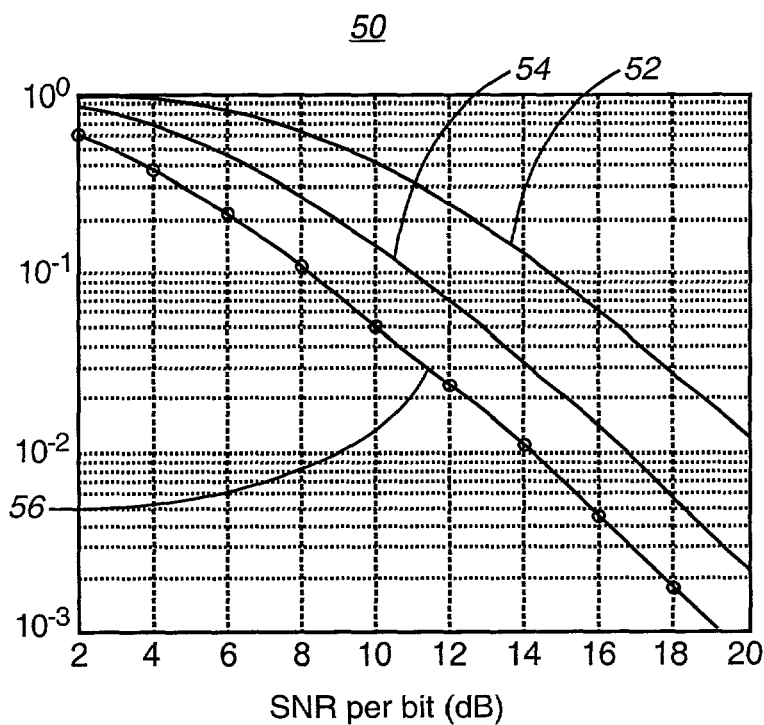
FIG. 2 illustrates a graphical represntation of the relationship between error probabilities and signal-to-noise ratios of data encoded pursuant to various coding techniques and transmitted upon a communication channel.

FIG. 2 illustrates a graphical representation, shown generally at 50 of curves, here curves 52, 54, and 56, of error probabilities plotted as functions of signal-to-noise ratios (SNR) of multiple, here four, bursts of data transmitted between sending and receiving stations using various coding techniques. The curve is representative of transmission of burst of a conventional 8-state space-time code with a rate of one. The curve 54 is representative of transmission of bursts of a simple repetition code in which the same coded data is transmitted from the same antenna transducers twice in consecutive bursts i.e. the repetition is done inside the same block. The rate of this code is ½. And, the curve 56 is representative of transmission of bursts of data encoded utilizing the encoder 20 pursuant to an embodiment of the present invention. The rate of the code is ½.

Figure 3:
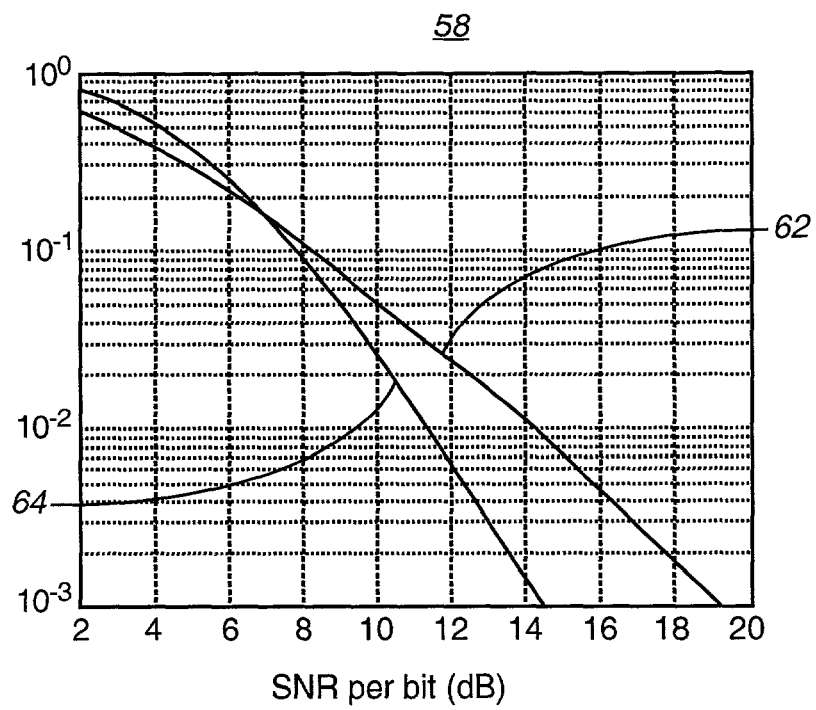
FIG. 3 illustrates another graphical representation, similar to that shown in FIG. 2.

FIG. 3 illustrates a graphical representation, shown generally at 58, of curves 62 and 64, of error probabilities plotted as functions of SNRs of multiple burst of data also transmitted between sending and receiving stations. The curve 62 is representative of transmission of data utilizing a simple repetition code where the same coded data is transmitted in two separate blocks. In this case, the channels are assumed to correspond to both antennas and first and second transmissions are all independent. The rate of the code is ½.

Analysis of the rate ½ scheme gives ~6 dB gain when compared with the underlying rate 1 ST-code. And, the rate ½ scheme gives 2.5–3 dB gain when compared with the simple rate ½ repetition code.

Figure 4:
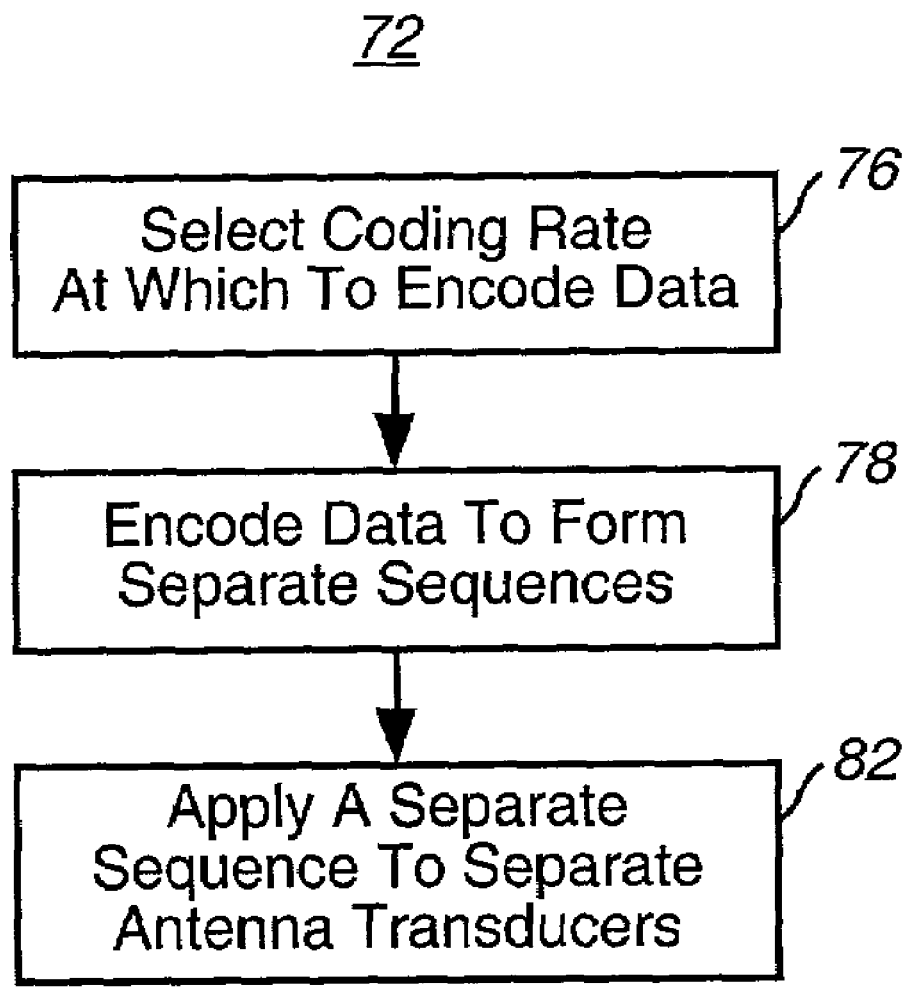
FIG. 4 illustrates a method flow diagram listing the method of operation of the method of an embodiment of the present invention.

FIG. 4 illustrates a method, shown generally at 72, which lists the method steps of the method of operation of an embodiment of the present invention. The method 72 space-time encodes data at a selected coding rate. First, and as indicated by the block 76, the coding rate at which the data is to be encoded is selected. Then, and as indicated by the block 78 the data is encoded to form separate encoded data sequences. And, as indicated by the block 82 a separate data sequence is applied to each of at least two locations such as the antenna transducers, in which the separate data sequences have separate permutations of the data.

Thereby, a manner is provided by which to space-time encode data such that more than one, or all, of the permutations of code vectors generated during coding operations are formed at a sending station and sent to a receiving station.

The previous descriptions are of preferred examples for implementing the invention, and the scope of the invention should not necessarily be limited by this description. The scope of the present invention is defined by the following claims.

What is claimed is:

1. Apparatus for a sending station operable in a communication system for sending data upon a channel susceptible to distortion, the sending station having a first location from which the data is sent and at least a second location from which the data is sent, said apparatus for space-time encoding the data at a selected coding rate, the selected coding rate a selected one of a first coding rate and at least a second coding rate, said apparatus comprising:

a space-time encoder coupled to receive indications of the selected coding rate and to receive the data formed of data symbols to be sent by the sending station, said space-time encoder encoding each data symbol of the data symbols into a set of coded symbols that forms a code vector, and providing, at successive time periods, permutations of the coded symbols of each code vector to each of the first location and the at least the second location, such that, at completion of the successive time periods, each coded symbol of the set is sent from each of the first and at least second locations.

2. The apparatus of claim 1 wherein the selected coding rate to which said space-time encoder is coupled to receive indications thereof comprises a fractional coding rate.

3. The apparatus of claim 1 wherein the sending station is operable to effectuate a first communication service at a first rate and to effectuate at least a second communication service at least at a second rate and wherein the indications of the selected coding rate are of values responsive to which of the first and at least second communication services are to be effectuated.

4. The apparatus of claim 1 wherein the communication system comprises a radio communication system, wherein the channel is defined upon a radio link susceptible to fading, and wherein the first location and the at least the second location to which the data symbols of the code vector formed by said space-time encoder are applied comprise a first antenna transducer and at least a second antenna transducer.

5. The apparatus of claim 1 wherein the coded symbols provided during each time period by said space-time encoder are provided in bursts.

6. The apparatus of claim 5 wherein said space-time encoder comprises a trellis encoder that forms coded symbols encoded pursuant to a trellis-encoding technique.

7. The apparatus of claim 5 wherein said space-time encoder provides a set of the coded symbols during each burst, each burst represented by an index 1, wherein the at least the second location from which the data is sent from the sending station further comprises n locations, and wherein the index 1 is defined by:

$$1 = \mod(1-1, n) + 1.$$

8. The apparatus of claim 7 wherein said space-time encoder forms an eight-state space-time code and wherein the data applied to said space-time encoder is encoded pursuant to the eight-state space-time code.

9. The apparatus of claim 1 further comprising a receiving station for receiving the data communicated upon the channel, subsequent to encoding thereof by said space-time encoder, said apparatus further for decoding the data once received at the receiving station, said apparatus comprising:
a space-time decoder coupled to receive indications of the data communicated upon the channel and received at the receiving station, said space-time decoder for decoding the indications to form a decoded representation of the data.

10. The apparatus of claim 9 wherein said space-time decoder performs cumulative metric decoding operations upon the indications of the data applied thereto.

11. The apparatus of claim 10 wherein the cumulative metric decoding operations performed upon the indications of the data utilized a permutation matrix.

12. The apparatus of claim 9 wherein each code vector formed by said space-time encoder and communicated upon the channel to the receiving station include every permutation of each code vector.

13. The apparatus of claim 12 wherein distortion introduced upon the data during communication upon the channel during the successive time periods affects the coded symbols of each code vector in a symmetrical manner.

14. A method for communicating in a communication system having a sending station that sends data formed of data symbols upon a channel susceptible to distortion, the sending station having a first location from which the data is sent and at least a second location from which the data is sent, said method for space-time encoding the data at a selected coding rate, the selected coding rate a selected one of a first coding rate and at least a second coding rate, said method comprising:
selecting the coding rate at which the data formed of the data symbols is to be encoded;
encoding each data symbol of the data symbols into a set of data symbols that forms a code vector; and
applying, at separate time periods, permutations of the coded symbols of each code vector to each of the first location and the at least the second location, such that, at completion of the successive time periods, each coded symbol is sent from each of the first and at least second locations.

15. The method of claim 14 wherein the coding rate selected during said operation of selecting comprises a fractional coding rate.

16. The method of claim 14 wherein the communication system comprises a radio communication system, wherein the channel is defined upon a radio link susceptible to fading, wherein the first location comprises a first antenna transducer and at least a second antenna transducer, and wherein said operation of applying comprises applying a separate data symbols of the code vector to each of the first antenna transducer and the at least the second antenna transducer.

17. The method of claim 14 wherein the data sent by the sending station is sent in successive bursts.

18. The method of claim 14 wherein the communication system further receives the data communicated upon the channel at a receiving station, said method further comprises:
detecting at the receiving station the data communicated by the sending station upon the channel; and
decoding indications of the data detected during said operation of detecting to form a decoded representation of the data.

* * * * *